United States Patent [19]
Davis, Jr. et al.

[11] Patent Number: 4,742,556
[45] Date of Patent: May 3, 1988

[54] CHARACTER RECOGNITION METHOD

[76] Inventors: Ray E. Davis, Jr., 6 Craig Rd., Old Lyme; Robert G. Foster, 10 Princess Pine Ln., Clinton, both of Conn. 06371; Michael J. Westkamper, Cedar Hill Ln., Salem, Conn. 06415; Dana Duncan, 10-2 Brown's Ln., Old Lyme, Conn. 06371; James R. Hall, 31 Hurd Bridge Rd., Clinton, Conn. 06413; Dennis L. Nudelman, 28 Paula Ln., Waterford, Conn. 06385

[21] Appl. No.: 776,613

[22] Filed: Sep. 16, 1985

[51] Int. Cl.⁴ ............................................... G06K 9/38
[52] U.S. Cl. ........................................ 382/51; 382/9; 382/10; 382/18; 382/30; 382/47; 382/48; 382/50; 358/263
[58] Field of Search ............... 382/9, 10, 13, 18, 22, 382/25, 30, 34, 47, 48, 50, 51, 52, 56, 47, 48; 358/263

[56] References Cited

U.S. PATENT DOCUMENTS

| | | | |
|---|---|---|---|
| 4,326,258 | 4/1982 | de la Guardia | 382/52 |
| 4,344,146 | 8/1982 | Davis, Jr. et al. | 364/552 |
| 4,574,393 | 3/1986 | Blackwell et al. | 382/18 |
| 4,610,025 | 9/1986 | Blum et al. | 382/9 |

FOREIGN PATENT DOCUMENTS 2031207 4/1980 United Kingdom .

Primary Examiner—Leo H. Boudreau
Assistant Examiner—Jose L. Couso

[57] ABSTRACT

A character recognition method comprising the steps of (1) acquiring a two dimensional array of pixels, (2) locating a character, (3) determining the size of the character, (4) reducing the number of pixels associated with the character by scaling it down to a smaller dot matrix and (5) thresholding the matrix dots using a histogram to form a binary character representation.

22 Claims, 4 Drawing Sheets

Microfiche Appendix Included
(2 Microfiche, 66 Pages)

| | 3 | 2 | | 3 | | 2 | | 3 | |
|---|---|---|---|---|---|---|---|---|---|
| 2 | 43|42|40|39|35|35|39|40|42|43 |
| | 44|41|39|35|34|33|39|40|41|43 |
| 3 | 43|39|35|34|30|30|35|39|40|42 |
| | 44|41|34|33|29|28|34|38|41|43 |
| | 44|42|32|30|28|29|31|39|41|43 |
| 2 | | | | | | | | | | |
| 3 | | | | | | | | | | |

Fig. 6.

|   |   |   | 63 | 63 |   |   |   |
|---|---|---|----|----|---|---|---|
| O | O | O | 63 | 63 | O | O | O |
| O | O | O | 63 | O  | 63| O | O |
| O | O | 63| O  | O  | 63| O | O |
|   |   |   |    |    |   |   |   |

Fig. 7.

| O | O | O | 1 | 1 | O | O | O |
|---|---|---|---|---|---|---|---|
| O | O | O | 1 | O | 1 | O | O |
| O | O | 1 | O | O | 1 | O | O |
|   |   |   |   |   |   | O | O |

CHARACTER RECOGNITION METHOD

REFERENCE TO MICROFICHE APPENDIX

Filed with this application is a microfiche appendix containing a suitable program for implementing the preferred embodiment of the invention. The microfiche appendix comprises a total of two microfiche and a total of sixty frames.

BACKGROUND AND BRIEF DESCRIPTION OF THE INVENTION

The present invention relates to a character recognition method and, more particularly, to a user-friendly alpha-numeric character recognition method.

It is known to employ a solid state TV camera in a video inspection system. For example, U.S. Pat. No. 4,344,146 to Ray E. Davis, Jr. et al, which is entitled "Video Inspection System" and is assigned to the assignee of the present application, discloses the use of such a TV camera in a high speed, real time video inspection system wherein the TV camera has at least sixteen levels of grey scale resolution. It is also known to employ a solid state TV camera in a video measuring system. For example, Ser. No. 596,842 filed Apr. 4, 1984 by Ray E. Davis, Jr. et al, now U.S. Pat. No. 4,628,553 which is entitled "Video Measuring System" and is assigned to the assignee of the present application, discloses the use of such a TV camera in a fast, efficient, user-friendly video measuring system useful for both quality control and process control. Further, it is known to employ a vidicon camera in a method and apparatus for identifying images found, for example, on a "cents off" coupon. Such a system is shown in GB No. 2,031,207A.

The present invention is a computer-based vision system having the capability of reading printed characters and enables the user to verify, sort and tabulate products quickly and accurately. The system can read individual alpha-numeric characters in almost any printed font and can form words from these characters. The words can then be used in data analysis by another computer system or by the instant character recognition system. Examples of such data analyses include sorting of products by product name, tabulating for automatic factory invoicing and verifying the print quality of date and lot codes.

In a preferred embodiment the present invention employs a pair of solid state TV cameras, a pair of interface/memory circuits (also known as "framegrabbers"), a pair of TV monitors, a computer, a keyboard, a joystick and strobe lights. In the system software are stored "menus" which guide the operator in the use of the system. These menus and the manner in which they are presented render the system very user-friendly.

The basic steps of the character recognition process of the present invention are set forth below. These steps are used both in "teaching" a known character to the system, in the course of building up a character library, and in "reading" an unknown character and attempting to match the unknown character with a known character stored in the library. The basic process steps are set forth below:

1. Acquire an image from the TV camera using a framegrabber.
2. Define a window search area using the joystick to move a cursor on the TV monitor.
3. Search for a character by scanning the search window to locate the left, right, top and bottom most points of the character.
4. Determine the character width and height in terms of pixels, each pixel having a grey scale value.
5. Calculate the number of pixels per dot required to fit the character into a dot matrix, distributing any extra pixels uniformly among the dots.
6. Calculate a single grey scale value for each of the dots in the dot matrix by combining the values for the pixels associated with each dot.
7. Generate a grey scale histogram using the newly calculated grey scale values for the dots in the dot matrix.
8. Determine a grey scale threshhold for the dots in the dot matrix.
9. Convert each dot data point from its grey scale value to a binary value.

BRIEF DESCRIPTION OF THE DRAWINGS

The present invention is described with reference to the following drawings which form a part of the specification and wherein:

FIG. 6 is a diagram of a portion of the dot matrix following threshholding; and

FIG. 7 is a diagram of a portion of the dot matrix following conversion to binary values.

DETAILED DESCRIPTION OF A PREFERRED EMBODIMENT

Figure 1:
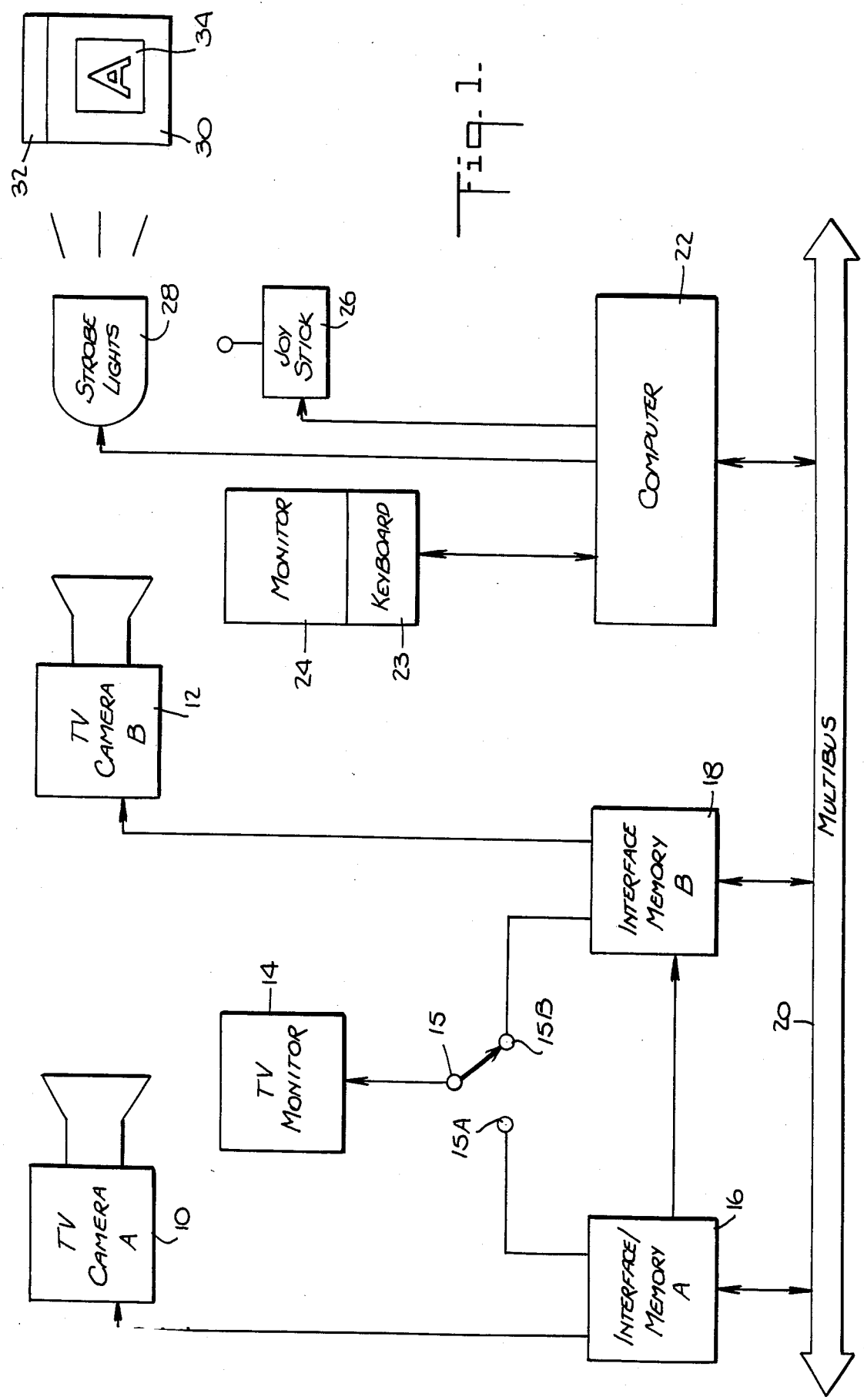
FIG. 1 is a functional block diagram of a preferred embodiment of the video measuring system of the present invention.

The basic system architecture of a preferred embodiment is shown in FIG. 1. The system employs two TV cameras 10 and 12, designated "A" and "B." Connected to TV cameras 10 and 12 are two interface/memory units 16 and 18, also designated "A" and "B." Associated with TV cameras 10 and 12 is a TV monitor 14 which is connected to either interface/ memory 16 or interface/memory 18, depending on the position of switch 15. TV camera 10 and interface/memory 16 form channel "A," while TV camera 12 and interface/memory 18 form channel "B." Two channels are employed because when the system is used, for example, to inspect packages on a high speed fill line, these packages frequently have both front and rear labels and it is desirable to inspect both labels.

Interface/memory units 16 and 18 are connected to computer 22 via a conventional multibus arrangement. Also connected to computer 22 are joystick 26, strobe lights 28, keyboard 23 and monitor 24. The operator uses keyboard 23 to communicate with computer 22 and uses joystick 26 to manipulate the cursor on monitor 24. Strobe lights 28 illuminate package 30, which comprises a top closure 32 and a label 34 containing the alpha numeric character "A". The strobe lights are synchronized with the TV camera and the movement of package 30.

Monitor 14 and monitor 24 may, for example, be a Panasonic TR-932 dual monitor made by Matsushita Electric, Osaka, Japan. Joystick 26 may be a 91 MOB-6 joystick made by Machine Components Corp., 70 New Tower Road, Plainview, N.Y. 11803. Strobe lights 28 may be a Model 834 dual stroboscope control unit made by Power Instruments, Inc., 7352 North Lawndale, Skokie, Il. 60076. Keyboard 23 may be a VP-3301 keyboard data terminal made by RCA Microcomputer Marketing, New Holland Avenue, Lancaster, Pa. 17604. Computer 22 may be an Am 97/8605-1 8086 16 bit MonoBoard Computer made by Advanced Micro Devices, 901 Thompson Place, P. 0. Box 453, Sunnyvale, Calif. 94086. This computer is software transparent to code written for the SBC-86/05 and SBC-86/12A computers. A suitable program for implementing the preferred embodiment of the invention disclosed herein has been filed as a microfiche appendix. Interface/memory units 16 and 18 may be "framegrabber" boards Model VG-120B made by Datacube, Inc., 4 Dearborn Road, Peabody, Mass. 01960. These units acquire a full screen of video information from any EIA-standard video source. The information is stored in an on-board memory for access by any MULTIBUS-based computer. The Model VG-120B framegrabber also generates EIA-standard video from the on-board memory for a TV monitor. Finally, TV cameras 10 and 12 may be Model KP-120 solid state TV cameras made by Hitachi Denshi America, Ltd., 175 Crossways Park West, Woodbury, N.Y. 11797. This is a solid state black and white TV camera employing solid state imaging. It has a two dimensional photosensor array with 320 horizontal and 240 vertical picture elements or 76,800 pixels. The framegrabbers captures this information.

The system operation will now be explained with reference to a preferred embodiment of the invention.

The first step in the character recognition process is to acquire an image from the camera using the framegrabber. When the package is properly positioned, an indication is supplied to the computer which causes the strobe lights to fire, thereby freezing the package motion. The framegrabber digitizes the camera RS-170 video signal and stores the single frame of camera data as a 320 by 240 array of pixels.

Figure 2:
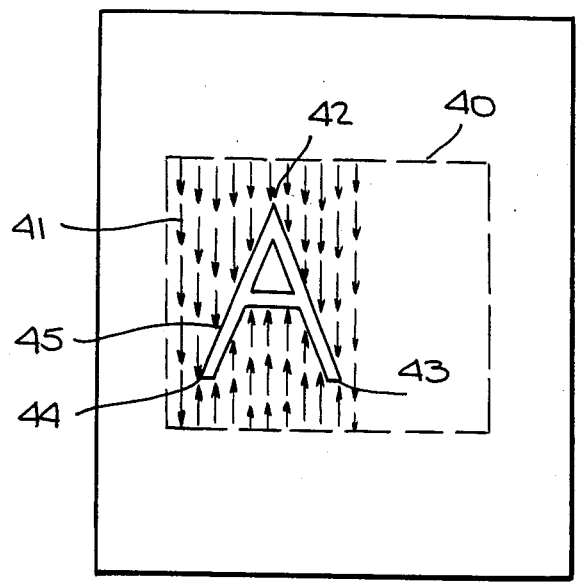
FIG. 2 is a diagram showing the search pattern within a search window.

The computer now initiates a search for the first alpha numeric character within a predefined search window. For example, the computer starts the search at the upper left hand corner of the search window and searches down the window search area until the bottom of the window is reached or the first character is found. This search pattern is shown in FIG. 2, wherein 40 designates the search window and 41 the direction of search. If the bottom of the scan area is reached without finding the left most edge of the character, then the scan shifts to the right one pixel at the top of the search window and scans down again.

The left most edge 44 of the character is found when the calculated intensity gradient over a 3 pixel vertical line exceeds the preselected gradient threshhold level. The intensity gradient is the rate of change of light intensity at a particular point and has both a magnitude and a direction. This gradient edge detection is, in effect, a form of high pass filtering.

After the left most edge 44 of the character has been located, scanning is continued from the top of the search window to the next top edge 45 of the character. Each time a new character top edge is located, the information is stored and later used to determine the top most edge 42 of the character. The pattern of scanning from the top of the search window to the top edge of the character continues until the scan hits the bottom of the scan area. The preceding character top edge 43 then becomes the right most edge of the character.

The system next locates the bottom most edge of the character. This is accomplished by scanning up from the bottom of the search window, starting at left most edge 44. Scanning continues incrementally, left-to-right, until right most edge 43 is again located. Each time a new character bottom edge is located, the information is stored and later used to determine the bottom most edge of the character.

Having determined the left, right, top and bottom most edges of the character, the character pixel width and pixel height are now calculated by differencing the left and right most edges and the top and bottom most edges, respectively. The character pixel width and height are then used to determine the pixel grouping required to fit the entire character into an 8 by 10 dot matrix. Thus, the character pixel width is divided by 8 to determine the number of pixels per dot in the horizontal direction. Similarly, the character pixel height is divided by 10 to determine the number of pixels per dot in the vertical direction. This determination takes into consideration the fact that the number of pixels in the horizontal and vertical directions may not go evenly into 8 by 10 dots. The extra pixels in the horizontal and vertical directions are inserted evenly as extra pixels in the 8 by 10 dot matrix.

Figure 3:
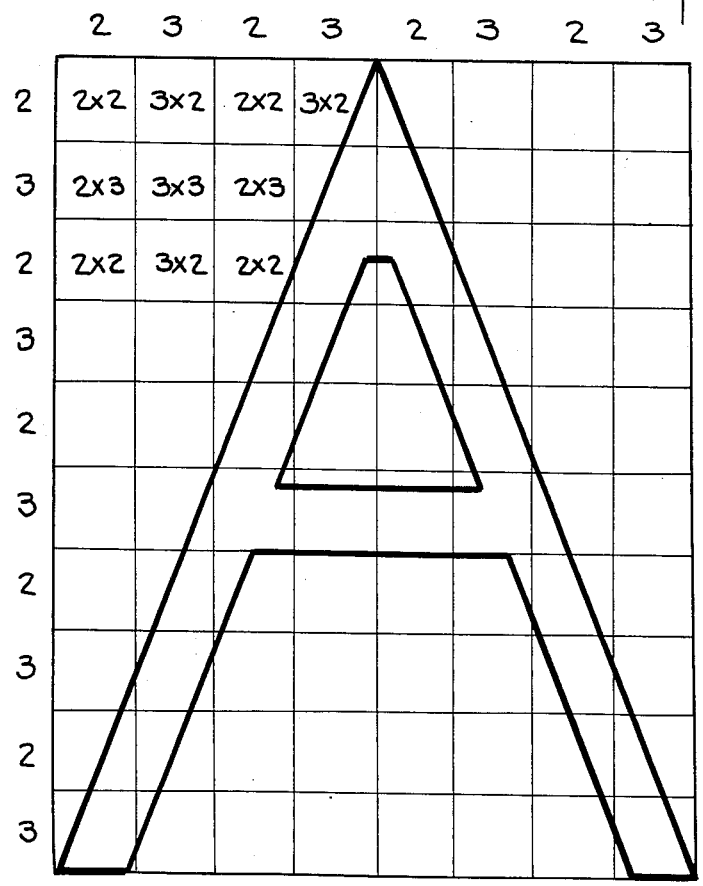
FIG. 3 is a diagram showing a character broken down into an 8 by 10 dot matrix.

In the example shown in FIG. 3, the character is 20 pixels wide and 25 pixels high. Dividing the 20 pixels by the 8 horizontal dots yields 2 pixels per dot, with 4 pixels left over. The 4 extra pixels are assigned to every other dot. Thus, the number of pixels per dot horizontally are 2, 3, 2, 3, 2, 3, 2 and 3. In the vertical direction, dividing 25 pixels by 10 dots yields 2 pixels per dot, with 5 pixels left over. These extra pixels are assigned to every other dot so that the number of pixels per dot vertically is 2, 3, 2, 3, 2, 3, 2, 3, 2 and 3.

Figures 4, 5:
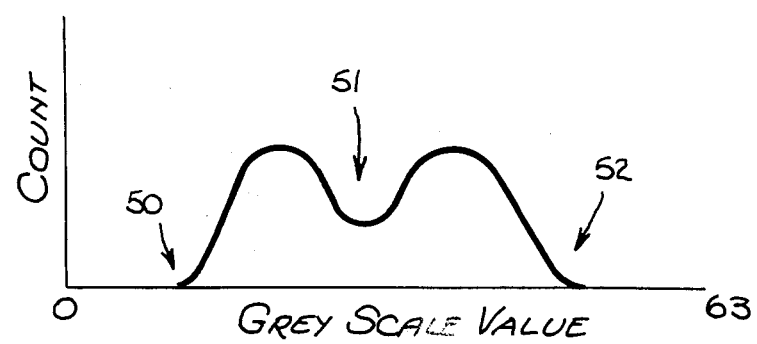
FIG. 4 is a diagram showing grey scale values for the pixels associated with certain of the dots in the dot matrix.
FIG. 5 is a grey scale histogram of the dot matrix.

FIG. 4 shows a portion of the 8 by 10 dot matrix with actual pixel grey scale values (0 to 63) for the pixels assigned to certain of the dots. Because the character was 20 by 25 pixels, there are 500 pixels associated with the 8 by 10 dot matrix. These 500 pixel character data points are now transferred to the on board computer data random access memory "RAM") to speed up processing. A single value for each of the 80 dots in the 8 by 10 dot matrix is now computed by forming, for example, an average grey scale value from the pixels associated with each dot. Thus, in FIG. 4 the six grey scale values 43, 39, 44, 41, 44 and 42 average out to 42. This reduction of the number of data points from 500 (20 by 25 pixels) to 80 (8 by 10 dots) reduces the processing time and improves the effective signal-to-noise ratio of the character representation. This is, in effect, a form of low pass filtering.

The next step in the character recognition process is to generate a grey scale histogram for the 80 grey scale data points in the 8 by 10 dot matrix. The histogram plots grey scale value versus counts (the number of dots having that grey scale value). A typical grey scale histogram is shown in FIG. 5. The grey scale histogram is then used to threshhold each of the 80 dots in the 8 by 10 dot matrix. The threshhold value will then be used to convert each grey scale dot in the 8 by 10 dot matrix into a binary dot data point.

When the lighting and image contrast are properly adjusted, the grey scale histogram will have most of the data within a relatively narrow range of grey scale values. The left and right endpoints 50 and 52 of the grey scale histogram are shown in FIG. 5. The threshhold value is the midpoint 51 between the two endpoints of the grey scale histogram. If, for example, the threshhold is 35, then dots having a grey scale value of 35 or above are given a threshhold value of 63 (white). Similarly, those dots having a grey scale value below 35 are given a threshhold value of 0 (black). Each threshhold data point is then converted to a binary data point, with 63 becoming binary 1 (white) and 0 becoming binary 0 (black). This threshholding operation is, in effect, a form of high pass filtering.

The result of the threshholding and conversion operations is a character defined by 10 horizontal rows of 8 dot data points. Therefore, each row is an 8-bit byte. The character, which is now defined by ten 8-bit bytes of digital data, can be stored in a library for future reference. An entire library may be built up in this fashion.

In attempting to "read" an unknown character, the character is first reduced to ten 8 bit bytes in the manner just described. The digital representation of the unknown character is then compared, data point by data point, with characters in the library of known characters. The comparison is effected by EXCLUSIVE ORing each byte of the unknown character with each byte of the character library. The results of each EXCLUSIVE OR operation is the number of bits by which the unknown character differs from the library character with which it is being compared. The number of differences per character are saved until all characters in the library have been compared with the unknown character. The library character with the lowest number of different dots is most likely to be the correct character.

If the unknown character does not match any of the characters in the library, then the left most edge of the character is shifted to the right by one pixel and the character is reprocessed to generate a new digital representation of the unknown character. This single bit shift of the pixel data points corrects for a possible error in locating the left most edge by doing a simplified form of cross correlation. This reprocessing of the unknown character data will normally happen only once. If after two complete tries at processing the character error count (the number of different dots) is still too large (i.e., exceeds a predetermined threshhold), then the unknown character is deemed to be the library character with the smallest error count, but the character is flagged as being of guestionable validity.

Successive characters are processed in the manner just described. When all characters on the current image plane have been processed, then the system will compare this set of characters with known words in the library and, if the system is being used for guality control, either accept or reject the product based on the result of that comparison.

The invention disclosed and claimed herein is not limited to the preferred embodiment shown or to the exemplary application of that embodiment to the inspection of packages on high speed fill lines since modifications will undoubtedly occur to persons skilled in the art to whom this description is addressed. Therefore, departures may be made from the form of the present invention without departing from the principles thereof. For example, it is not necessary to use two TV cameras. Similarly, it is not necessary to use a joystick to define the window search area. The coordinates of the window search area may be entered through the keyboard. Further, the scan directions need not be vertical but may be horizontal or a combination of both. The intensity gradient need not be calculated over a three pixel interval. A different interval may be employed. Also, the pixels need not be fitted to an 8 by 10 dot matrix. Other size matricies may be employed. These and other variations are design choices within the level of skill of those skilled in the art.

What we claim is:

1. A character recognition method comprising the steps of:
   (1) acquiring an image from a solid state TV camera, said image comprising a two dimensional array of pixels, said pixels having grey scale values associated therewith;
   (2) locating a character within said image by calculating intensity gradients and determining when said intensity gradients exceed predetermined values;
   (3) determining the size of said character measured in pixels;
   (4) reducing the number of pixels associated with said character by a first determining the number of pixels per dot required to fit said character into a smaller dot matrix and then;
   (5) combining the pixels associated with each dot to form a matrix of dot data points having fewer dots than pixels;
   (6) generating a grey scale histogram for said dot data points;
   (7) using said histogram to determine a threshhold for the grey scale values associated with the dot data points; and
   (8) assigning binary values to said dot data points based on said threshhold to form a binary representation of said character.

2. A method according to claim 1 comprising the further step of:
   (9) displaying the digital representation of said character.

3. A method according to claim 1 comprising the further steps of:
   (9) displaying the digital representation of said character; and
   (10) assigning an ASCII character to the displayed character.

4. A method according to claim 1 comprising the further steps of:
   (9) displaying the digital representation of said character;
   (10) assigning an ASCII character to the displayed character; and
   (11) storing the displayed character.

5. A method according to claim 1 comprising the further steps of:
   (9) displaying the digital representation of said character;
   (10) assigning an ASCII character to the displayed character;
   (11) storing the displayed character; and
   (12) repeating steps (2) through (11) to build up a library comprising a plurality of characters.

6. A method according to claim 1 comprising the further step of:

(9) comparing the digital representation of said character with digital representations of characters stored in a library.

7. A method according to claim 1 comprising the further steps of:
(9) comparing the digital representation of said character with digital representations of characters stored in a library; and
(10) repeating steps (2) through (9).

8. A method according to any of claims 1 through 7 comprising the further step of defining a search window.

9. A method according to any of claims 1 through 7 wherein the pixels are combined by averaging the grey scale values of the pixels associated with each dot.

10. A method according to any of claims 1 through 7 wherein said dot matrix comprises an 8 by 10 array of 80 dots.

11. A method according to claim 10 wherein said 8 by 10 array comprises 10 rows having 8 dots per row.

12. A method according to claim 11 wherein said digital representation of said character comprises ten 8 bit bytes.

13. A method according to claims 6 or 7 wherein said comparing is effected by means of a plurality of EXCLUSIVE OR operations.

14. A method according to any of claims 1 through 7 wherein said grey scale histrogram has two maxima and said threshhold is located between said maxima.

15. A character recognition method comprising the steps of:
(1) acguiring an image from a solid state TV, camera, said image comprising a two dimensional array of pixels, said pixels having grey scale values associated therewith;
(2) locating a character within said image by calculating intensity gradients and determining when said intensity gradients exceed predetermined values;
(3) scanning the area in which said character is located to determine the left, right, top and bottom most edges of the character;
(4) determining the size of said character measured in pixels by differencing the left and right and top and bottom most edges, respectively;
(5) reducing the number of pixels associated with said character by first determining the number of pixels per dot required to fit said character into a smaller dot matrix and then;
(6) combining the pizels associated with each dot to form a matrix of dot data points having fewer dots than pixels;
(7) generating a grey scale histogram for said dot data points;
(8) using said histogram to determine a threshhold for the grey scale values associated with the dot data points; and
(9) assigning binary values to said dot data points based on said threshhold to form a binary representation of said character.

16. A method according to claim 15 wherein the pixels are combined by averaging the grey scale values of the pixels associated with each dot.

17. A method according to claim 16 wherein said dot matrix comprises an 8 by 10 array of 80 dots.

18. A method according to claim 17 wherein said 8 by 10 array comprises 10 rows having 8 dots per row.

19. A method according to claim 18 wherein said digital representation of said character comprises ten 8 bit byty.

20. A method according to any of claims 15 through 19 comprising the further steps of:
(10) displaying the digital representation of said character;
(11) assigning an ASCII character to the displayed character; and
(12) storing the displayed character.

21. A method according to any of claims 15 through 19 comprising the further step of comparing the digital representation of said character with digital representations of characters stored in a library.

22. A method according to any of claims 15 through 19 wherein said grey scale histogram has two maxima and said threshhold is located between said maxima.

* * * * *